United States Patent
McElroy et al.

(10) Patent No.: US 6,854,688 B2
(45) Date of Patent: Feb. 15, 2005

(54) SOLID OXIDE REGENERATIVE FUEL CELL FOR AIRPLANE POWER GENERATION AND STORAGE

(75) Inventors: James McElroy, Suffield, CT (US); Matthias Gottmann, Sunnyvale, CA (US)

(73) Assignee: Ion America Corporation, Moffett Field, CA (US)

( * ) Notice: Subject to any disclaimer, the term of this patent is extended or adjusted under 35 U.S.C. 154(b) by 0 days.

(21) Appl. No.: 10/299,863

(22) Filed: Nov. 20, 2002

(65) Prior Publication Data

US 2003/0205641 A1 Nov. 6, 2003

Related U.S. Application Data

(60) Provisional application No. 60/377,199, filed on May 3, 2002.

(51) Int. Cl.[7] ............................................... B64D 27/24
(52) U.S. Cl. ........................ 244/53 R; 244/58; 244/62; 429/26
(58) Field of Search ................................ 244/53 R, 60, 244/58; 429/17, 20, 26, 19

(56) References Cited

U.S. PATENT DOCUMENTS

| | | | | |
|---|---|---|---|---|
| 3,897,032 A | * | 7/1975 | Papst | 244/96 |
| 5,074,489 A | * | 12/1991 | Gamzon | 244/2 |
| 5,106,035 A | * | 4/1992 | Langford, III | 244/59 |
| 5,810,284 A | * | 9/1998 | Hibbs et al. | 244/58 |
| 5,890,676 A | * | 4/1999 | Coleman et al. | 244/128 |
| 6,119,979 A | * | 9/2000 | Lee et al. | 244/97 |
| 6,131,851 A | * | 10/2000 | Williams | 244/58 |
| 6,425,552 B1 | | 7/2002 | Lee et al. | |
| 6,550,717 B1 | * | 4/2003 | MacCready et al. | 244/13 |
| 6,568,633 B2 | * | 5/2003 | Dunn | 244/59 |
| 2002/0058175 A1 | | 5/2002 | Ruhl | |
| 2002/0114985 A1 | * | 8/2002 | Shkolnik et al. | 429/20 |

OTHER PUBLICATIONS

Low Cost, High Efficiency Reversible Fuel Cell (And Electrolyzer) Systems, Proceedings of the 2001 DOE Hydrogen Program Review, NREL/CP–570–30535.
Regnrative Fuel Cells for High Altitude Long Endurance Solar Powered Aircraft, F. Mitlitsky, et al, 28th Intersociety Energy Conversion Engineering Conference (IECEC), Jul. 28, 1993, UCRL–JC–113485.
Unitized Regenerative Fuel Cells for Solar Rechargeable Aircraft and Zero Emission Vehicles, F. Mitlitsky, et al, 1994 Fuel Cell Seminar, Sep. 6, 1994, UCRL–JC–117130.
Low Cost, High Efficiency Reversible Fuel Cell Systems, Proceedings of the 2002 U.S. DOE Hydrogen Program Review NREL/CP–610–32405.
Low Cost Reversible Fuel Cell System, Proceedings of the 2000 Hydrogen Program Review—NREL/CP–570–28890.
U.S. patent application No.: 10/428,804 (May 5, 2003).

* cited by examiner

Primary Examiner—Galen Barefoot
(74) Attorney, Agent, or Firm—Foley & Lardner LLP

(57) ABSTRACT

A Solid Oxide Regenerative Fuel Cell (SORFC) or a Solid Oxide Fuel Cell (SOFC) is incorporated into an electrically powered airplane to provide either regenerative or primary electrical energy. The SORFC, the SOFC, or any other suitable fuel cell within an airplane may also be used to heat payload or equipment within the airplane. The SORFC is not only capable of generating electrical energy from fuel and a suitable oxidizer, but can also generate fuel through electrolysis of oxidized fuel. Thus, the SORFC system powering an airplane can obtain oxygen oxidant reactant from the air and avoid the complexity, weight, volume, and cost associated with oxygen storage.

45 Claims, 12 Drawing Sheets

SOLID OXIDE REGENERATIVE FUEL CELL FOR AIRPLANE POWER GENERATION AND STORAGE

BACKGROUND OF THE INVENTION

This application claims benefit of Provisional Application No. 60/377,199, filed May 3, 2000.

The invention generally relates to the fuel cells, and specifically to use of a solid oxide fuel cell system as an energy converter in an airborne vehicle, such as in an airplane.

A solid oxide fuel cell (SOFC) is an electrochemical device that converts chemical energy directly into electrical energy. A Solid Oxide Regenerative Fuel Cell (SORFC) is an electrochemical device that converts chemical energy directly into electrical energy and subsequently reconverts electrical energy back to the original chemical energy. This device differs significantly from rechargeable batteries in that the chemicals are stored outside of the SORFC converter. The SORFC system has many building electrical energy storage applications that cannot be satisfied by batteries. For example, a SORFC system for building power generation is discussed in the Proceedings of the 2001 DOE Hydrogen Program Review NREL/CP-570-30535.

BRIEF SUMMARY OF THE INVENTION

In one preferred aspect of the present invention, there is provided a solid oxide fuel cell adapted to power an airborne vehicle.

In another preferred aspect of the present invention, there is provided an electrically powered airplane, comprising an airplane body, a solid oxide fuel cell adapted to power the airplane, and a fuel storage vessel adapted to provide fuel to the solid oxide fuel cell.

In another preferred aspect of the present invention, there is provided an electrically powered airplane, comprising an airplane body, a fuel cell adapted to power the airplane and to heat remotely located payload or equipment in the airplane body, and a fuel storage vessel adapted to provide fuel to the solid oxide fuel cell.

In another preferred aspect of the present invention, there is provided a solid oxide fuel cell system, comprising a first means for providing oxygen ion conduction to generate a potential difference between a fuel electrode and an oxygen electrode, and a second means for providing electric power to an airborne vehicle form the potential difference.

In another preferred aspect of the present invention, there is provided a method of generating power in an airborne vehicle, comprising providing a fuel and an oxidizer to a solid oxide fuel cell, and providing electrical power from the fuel cell to a motor propeller system of the airborne vehicle.

In another preferred aspect of the present invention, there is provided an SORFC power generation system, comprising at least one SORFC cell, a fuel storage vessel, an oxidizer inlet, an oxidized fuel storage vessel, and a first means for (a) separating partially regenerated fuel provided from at least one SORFC cell into regenerated fuel and oxidized fuel, for directing the regenerated fuel into the fuel storage vessel and for directing oxidized fuel back into the at least one SORFC cell, and (b) separating partially oxidized fuel provided from the at least one SORFC cell into fuel and oxidized fuel, for directing the fuel back into the at least one SORFC, and for directing oxidized fuel into the oxidized fuel storage vessel.

DETAILED DESCRIPTION OF THE PREFERRED EMBODIMENTS

Figure 1:
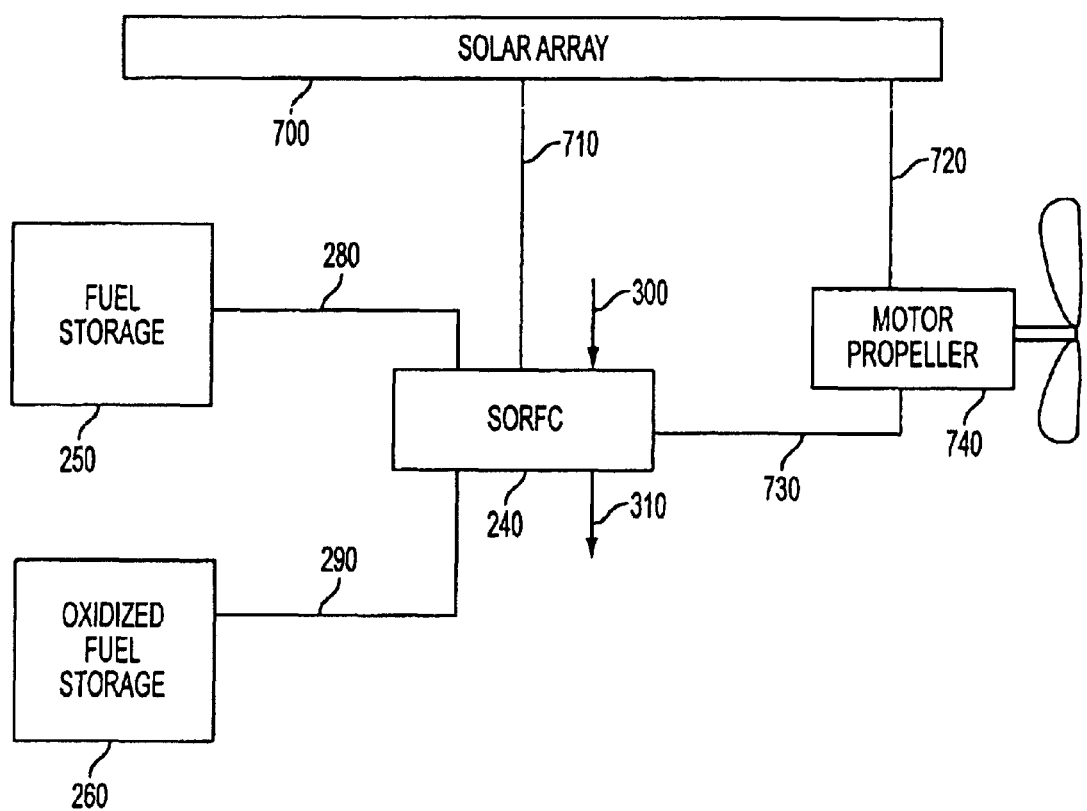
FIG. 1 is a schematic illustration of SORFC system in solar powered high altitude airplane.

The present inventors have realized that a solid oxide fuel cell, such as the SOFC and the SORFC, has unique properties that make it advantageous as an energy generation and storage device in an airborne vehicle, such as an airplane. The present inventors have realized that the SORFC does not require an independent source of oxygen or pure water when the SORFC is used for energy generation or storage for an airborne vehicle that operates in Earth's atmosphere. The SORFC system is distinct from other hydrogen-oxygen (or hydrocarbon-oxygen) regenerative fuel cell systems in that no water (or other oxidized fuel) is lost from the cell with the air or oxygen oxidant discharge. Therefore the SORFC can be operated open loop on the oxygen oxidant side without requiring any makeup of any reactants or process chemicals. In contrast, other regenerative fuel cells that operate with an open oxygen oxidant loop must have an independent source of pure water, as process water is lost with the air, oxygen oxidant discharge. Thus, the SORFC system operating in an airborne vehicle in the earth's atmosphere can obtain oxygen oxidant reactant from the air and avoid the complexity, weight, volume, and cost associated with oxygen oxidant storage.

The First Preferred Embodiment

An airborne vehicle is a vehicle capable of flying. A preferred type of airborne vehicle that uses the SORFC is a high altitude solar powered unmanned airplane. This airplane is used as a stationary platform for commercial communications, military surveillance or as a weapon platform. The high altitude solar powered unmanned airplane uses solar generated electricity to drive electric motor propeller and electrolyze water in the SORFC during the daylight and uses the stored fuel to generate electric power in the SORFC during the nighttime to drive an electric motor propeller system. Using the SORFC eliminates the need to store oxygen, as none of the process water is lost. This greatly increases the capability of the airplane due to the significant weight reduction. However, the SORFC may be used in any other type of airborne vehicle, such as manned airplanes, fuel powered airplanes or even helicopters.

A hydrogen/oxygen (i.e., hydrogen fuel, oxygen or air oxidizer) SORFC is preferred for use in the airborne vehicle. However, other SORFC types, such as hydrocarbon/oxygen types may be used instead. The use of a hydrogen/oxygen SORFC within the high altitude solar powered unmanned airplane provides the airplane with the capability to operate at high altitude for many months only returning to the ground for maintenance. The ability to use atmospheric oxygen (i.e., air) instead of stored oxygen saves sufficient mass to allow the airplane to fly at higher altitude and/or to carry an increased payload. The airplane, with a wing span in the range of 100 to 500 feet, such as about 200 feet and a mass of about 1000 to 3000 pounds, such as 1500 pounds, will generally fly above the weather at an altitude of between 45,000 to 90,000 feet. At these altitudes the airplane can be on station 24 hours a day without weather concerns. The airplane can loiter over a point on the ground or it can be relocated to a new location in the range of about 10–50 mph, such as 30 miles per hour. The total DC electrical power required for maintaining altitude is in the range of 7 to 9 kW.

In one aspect of the first embodiment, the airplane is powered by one SORFC system. However, in a preferred aspect of the first embodiment, the airplane is powered by multiple smaller SORFC systems distributed along the length of the wing(s). This results in an advantage in mass distribution and redundancy. The generally accepted mass allocation for the energy storage system for the high altitude solar powered unmanned airplane is about 400 pounds of which about 150 pounds is allocated to the SORFC.

Other potential regenerative fuel cell systems, such as the PEM regenerative fuel cell, produce the fuel cell discharge chemical byproduct (water) on the oxidant side of the cell. To open the oxygen oxidant system loop to take advantage of the mass savings associated with oxidant storage elimination, the byproduct water would be lost and the regenerative nature destroyed. Even if most of the byproduct water from an open loop oxidant could be captured, there are other deficiencies in the PEM open loop oxidant type of regenerative fuel cell. First, some water make up would be required as not all of the byproduct water could be captured. Second, the water vapor that is discharged would provide a condensation trail to easily identify the location of the airplane and this water could interfere with sensitive onboard sensors. Third, the altitude at which the airplane flies is within the range of maximum ozone concentration and the ozone ingested into the cell oxygen oxidant chambers is known to degrade organic species such as the organic PEM electrolyte.

The SORFC system overcomes the deficiencies of the hydrogen/oxygen PEM open loop oxidant regenerative fuel cell. First, a hydrogen ion is transported in the PEM fuel cell. In contrast, in the SORFC, an oxygen ion is transported across the electrolyte. Thus, the byproduct water is formed on the fuel side of the electrolyte in the SORFC. The only chemical produced or consumed within the SORFC oxidant chamber is oxygen and no water is lost from the open loop oxidant. This eliminates water make up, detectable condensation trails, and interference with sensors. Second, since no organic materials are preferably used within the SORFC stack, the hardware is immune to ozone degradation.

FIG. 1 illustrates a SORFC system within a high altitude solar powered unmanned airplane according to a preferred aspect of the first embodiment. Preferably, all of the airplane power comes from solar radiation. However, an alternative or an additional power source may also be used. The airplane contains a body which may include a fuselage as well as a wing structure (not shown for clarity). The top surface of the airplane's large wing structure is mostly covered with photovoltaic cells to form a solar array 700. The solar array 700 may also be located on other parts of the airplane. This array converts the solar radiation into DC electricity. During the daytime, when solar radiation is available, a portion of the DC electricity is delivered to the motor propeller system 740 (i.e., an electrical motor which rotates the propeller) from the solar array 700 via electrical cable 720. This provides thrust to the airplane during the daytime. Of course the SORFC system can be used with other types of airplane propulsion systems, such as a ducted fan, etc., and it also may be used on other types of airplanes.

Another portion of the DC electricity is delivered to the SORFC 240 from the solar array 700 via electrical cable 710. At the same time oxidized fuel (i.e., water) is delivered to the SORFC 240 from oxidized fuel storage vessel 260 via fluid conduit 290. Within SORFC 240, the water is electrolyzed using the DC electricity provided from array 700. The oxygen oxidant is discarded from the SORFC 240 via fluid conduit 310. For example, conduit 310 may be an outlet pipe which vents oxygen into the atmosphere. The hydrogen (or hydrocarbon) fuel is delivered to fuel storage vessel 250 from SORFC 240 via fluid conduit 280. Ambient air, if needed for thermal control, is delivered to SORFC 240 via fluid conduit 300. Any thermal control air is discharged from SORFC 240 via fluid conduit 310 along with the generated oxygen oxidant.

During the nighttime, when solar radiation is not available, the previously generated hydrogen (or hydrocarbon) fuel is delivered to SORFC 240 from fuel storage vessel 250 via fluid conduit 280. Simultaneously, ambient air as the oxidant source is delivered to the SORFC 240 via fluid conduit 300. Within SORFC 240, DC electricity is generated and delivered to the motor propeller system 740 via electrical cable 730 to provide thrust to the airplane during the nighttime. Depleted air is discharged from the SORFC 240 via fluid conduit 310. The air oxidant source flow also serves as a thermal control fluid. The oxidized fuel (water) is delivered from the SORFC 240 to the oxidized fuel storage vessel 260 via fluid conduit 290.

Second Preferred Embodiment

In a second preferred embodiment of the present invention, a non-regenerative solid oxide fuel cell (SOFC) is used as a primary power source for an airborne vehicle, such as the high altitude unmanned airplane. In this embodiment, all the energy for the airplane comes from fuel carried onboard. For missions of only a few hours to a few days duration, the high-energy conversion efficiency of the SOFC combined with its ability to effectively use the high altitude air as the oxidant makes this approach advantageous.

The use of hydrogen as the fuel is preferred because it allows the airplane to maintain a stealth character as the oxidized fuel (water) is stored and the airplane retains a zero emission status. However, if desired, a conventional hydrocarbon fuel (such as propane) may be used instead if the stealth characteristics are not important in the airplane.

As in the SORFC, the SOFC uses atmospheric air as the source of oxygen oxidant without compromising the stealth. The advantages of the SOFC compared to the open loop oxidant PEM fuel cell include the lack of a water vapor condensation trail with its further interference with onboard sensors and the tolerance to atmospheric ozone.

Figure 2:
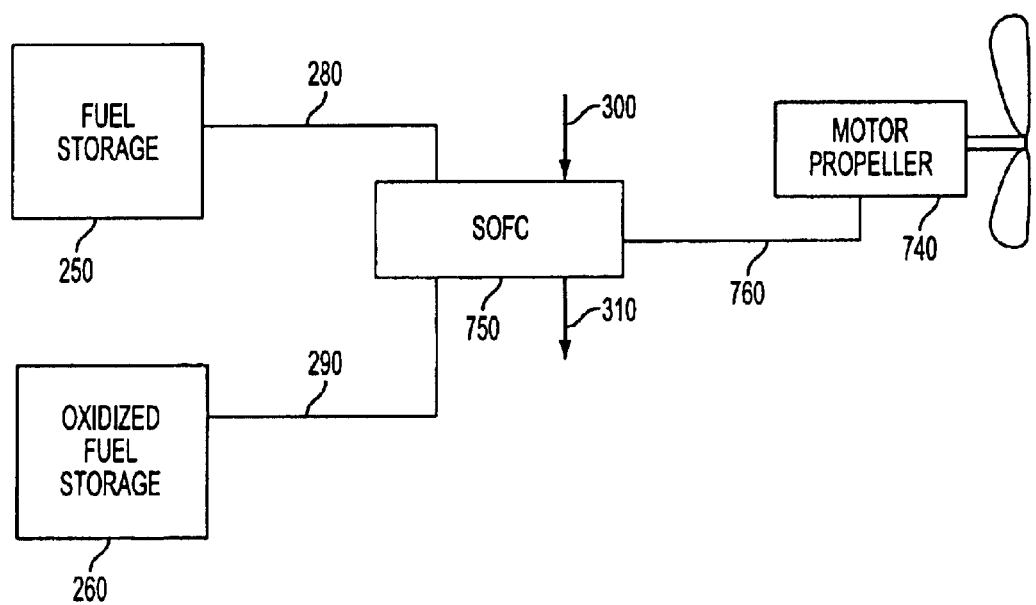
FIG. 2 is a schematic illustration of SOFC system in electrically powered high altitude airplane.

FIG. 2 illustrates a SOFC system within a high altitude unmanned airplane according to a preferred aspect of the second embodiment. Fuel (preferably hydrogen) is delivered from fuel storage vessel 250 to the SOFC 750 via fluid conduit 280. Simultaneously, ambient air oxidant oxygen is supplied to SOFC 750 via fluid conduit 300. Within SOFC 750, reactions produce DC electricity and oxidized fuel (water). The oxidized fuel is delivered from the SOFC 750 to the oxidized fuel storage vessel 260 via fluid conduit 290. If stealth characteristics are not important in the airplane, then the oxidized fuel may be vented into the atmosphere and the storage vessel 260 and conduit 290 may be omitted. The depleted oxidizer (i.e., oxygen depleted air) is vented into the atmosphere through conduit 310. The DC electricity is delivered from the SOFC 750 to the motor propeller system 740 via electrical cable 760 providing thrust for the airplane until the fuel is exhausted.

The Third Preferred Embodiment

In a third preferred embodiment a SORFC or a SOFC system is not only used to provide a high altitude solar powered unmanned airplane with electrical energy, but also provides heat for thermal conditioning of airplane systems or payload. SORFC and SOFC systems operate at elevated temperatures and generate heat during operation. Part of this heat can be harnessed and transported to airplane systems or payload that require heating. For example, for an airplane operating at 66,000 ft altitude, the ambient air temperature is approximately −55° C. Some of the equipment within the airplane should be kept at temperatures above this ambient temperature. This equipment may be heated using electric heating. However, electric heating adds additional power requirements to the airplane power supply system which can result in additional mass. Some of this additional mass can be eliminated if a heat transport loop is provided which transports thermal energy from the SORFC or SOFC to the equipment or payload that needs to be heated. Alternatively, in a manned airplane, the occupant compartment may be heated using heat from the SOFC or SORFC.

Figure 3:
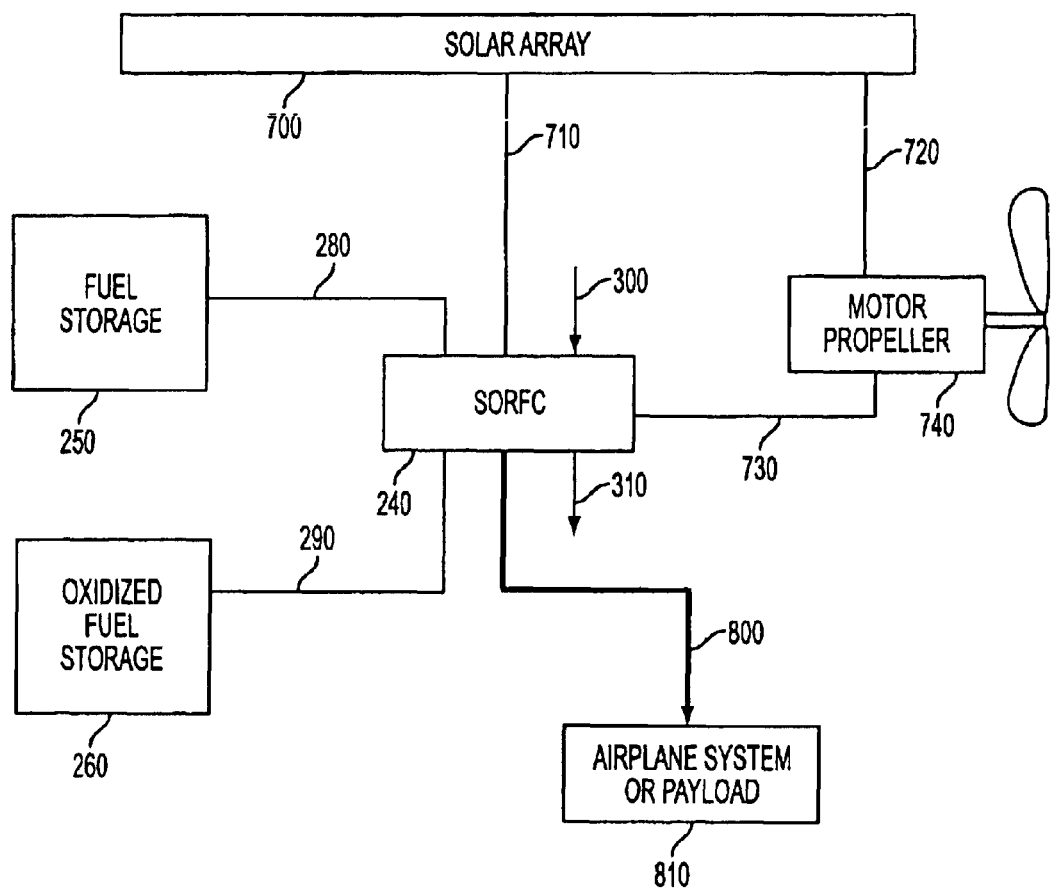
FIG. 3 is a schematic illustration of SORFC system providing electrical power and heat in solar powered high altitude airplane.

FIG. 3 illustrates an SORFC system within a high altitude solar powered unmanned airplane that also supplies heat to airplane systems or payloads, according to a preferred aspect of the third embodiment. The system of FIG. 3 is similar to that illustrated in FIG. 1, except that the SORFC 240 is used to heat an airplane system or payload 810 that is located in the airplane body remote from the SORFC system. Preferably all of the airplane power comes from solar radiation. The top surface of the airplane's large wing structure is mostly covered with photovoltaic cells to form a solar array 700. This array converts the solar radiation into DC electricity. During the daytime, when solar radiation is available, a portion of the DC electricity is delivered to the motor propeller system 740 from the solar array 700 via electrical cable 720. This provides thrust to the airplane during the daytime. Another portion of the DC electricity is delivered to the SORFC 240 from the solar array 700 via electrical cable 710. At the same time oxidized fuel (water) is delivered to the SORFC 240 from oxidized fuel storage vessel 260 via fluid conduit 290. Within SORFC 240 the water is electrolyzed using the DC electricity. The oxygen oxidant is discarded from the SORFC 240 via fluid conduit 310. The hydrogen fuel is delivered to fuel storage 250 from SORFC 240 via fluid conduit 280. Ambient air, if needed for thermal control, is delivered to SORFC 240 via fluid conduit 300. Any thermal control air is discharged from SORFC 240 via fluid conduit 310 along with the generated oxygen oxidant.

During the nighttime, when solar radiation is not available, the previously generated hydrogen fuel is delivered to SORFC 240 from fuel storage 250 via fluid conduit 280. Simultaneously, ambient air as the oxidant source is delivered to the SORFC 240 via fluid conduit 300. Within SORFC 240 DC electricity is generated and delivered to the motor propeller system 740 via electrical cable 730 to provide thrust to the airplane during the nighttime. Depleted air is discharged from the SORFC 240 via fluid conduit 310. The air oxidant source flow also serves as a thermal control fluid. The oxidized fuel (water) is delivered from the SORFC 240 to the oxidized fuel storage vessel 260 via fluid conduit 290.

The SORFC generates heat during charge and discharge operation. A heat transport loop 800 transports heat from the SORFC to the equipment (i.e., electronics, etc.) or payload 810 in need of heat. The heat transport loop 800 may comprise pipe(s) or duct(s) filled with a heat transfer medium, such as a gas or liquid. Preferably, the loop 800 uses air as the heat transfer medium. Cooling air is blown past or adjacent to the hot fuel cell stack 240 through the loop 800. The air absorbs heat as it is passed through loop 800 and the warmed air is guided toward or adjacent to the remotely located equipment or payload 810 that needs to be heated. Thus, the loop 800 provides heat to equipment or payload that would not ordinarily be heated by the SORFC (i.e., "remotely" located payload or equipment is payload or equipment that would not be substantially heated by the SORFC but for the loop 800). The loop 800 may be an open or a closed loop. The heat transport loop can also operate with a liquid or a two-phase re-circulation loop. Other modes of heat transfer, such as conduction or radiation can also be used.

Figure 4:
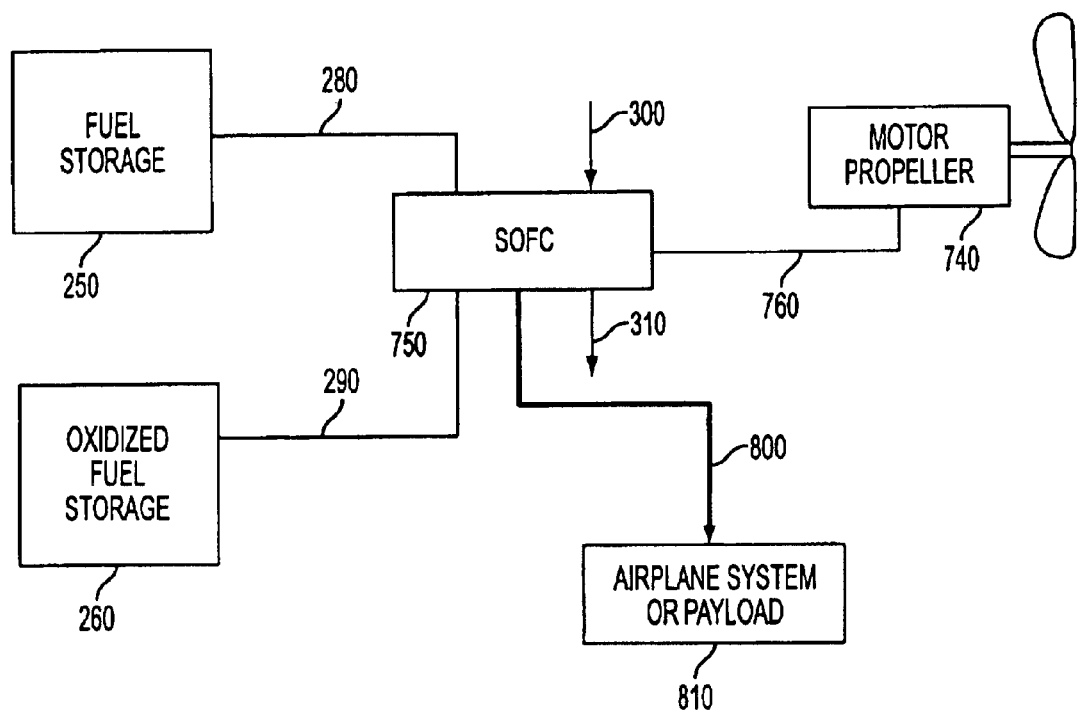
FIG. 4 is a schematic illustration of SOFC system providing electrical power and heat in electrically powered high altitude airplane.

Waste heat can also be used to heat payload or equipment 810 when a SOFC is acting as a primary power source for a high altitude airplane. FIG. 4 illustrates a SOFC system within a high altitude unmanned airplane used to supply heat to airplane systems or payload. The SOFC system in FIG. 4 is similar to the SOFC system shown in FIG. 2, except for the presence of the heat transfer loop 800.

Fuel (hydrogen) is delivered from fuel storage vessel 250 to the SOFC 750 via fluid conduit 280. Simultaneously, ambient air oxidant oxygen is supplied to SOFC 750 via fluid conduit 300. Within SOFC 750, reactions produce DC electricity and oxidized fuel (water). The oxidized fuel is delivered from the SOFC 750 to the optional oxidized fuel storage vessel 260 via fluid conduit 290. The DC electricity is delivered from the SOFC 750 to the motor propeller system 740 via electrical cable 760 providing thrust for the airplane until the fuel is exhausted.

A heat transport loop 800 transports heat from the SOFC to the equipment or payload 810 in need of heat. The heat transport loop 800 may comprise pipe(s) or duct(s) through which a heat transfer medium travels, similar to that described with respect to the system of FIG. 3. Heat transfer medium, such as cooling air, is blown past the hot SOFC stack 750, where the air absorbs heat. The warmed air is guided through the loop 800 to the equipment or payload 810 that needs to be heated. The heat transport loop can be open or closed loop and also operate with a liquid or a two-phase re-circulation loop. Other modes of heat transfer, such as conduction or radiation can also be used. It should be noted that while SORFC and SOFC systems are preferred for providing heat in the airplane, other fuel cell systems, such as PEM fuel cell systems, may be used instead.

The Fourth Preferred Embodiment

Any type of SOFC or SORFC may be used to provide power and/or heating for an airborne vehicle of the first through third embodiments. A preferred SORFC system for use in the airborne vehicle is described below. However, it should be noted that the SORFC system described below may be used to power and/or heat objects other than an airborne vehicle, such as a ground based vehicle (i.e., automobile, etc.), water based vehicle (i.e., ship), a building or various devices requiring heat or power.

Figure 5:
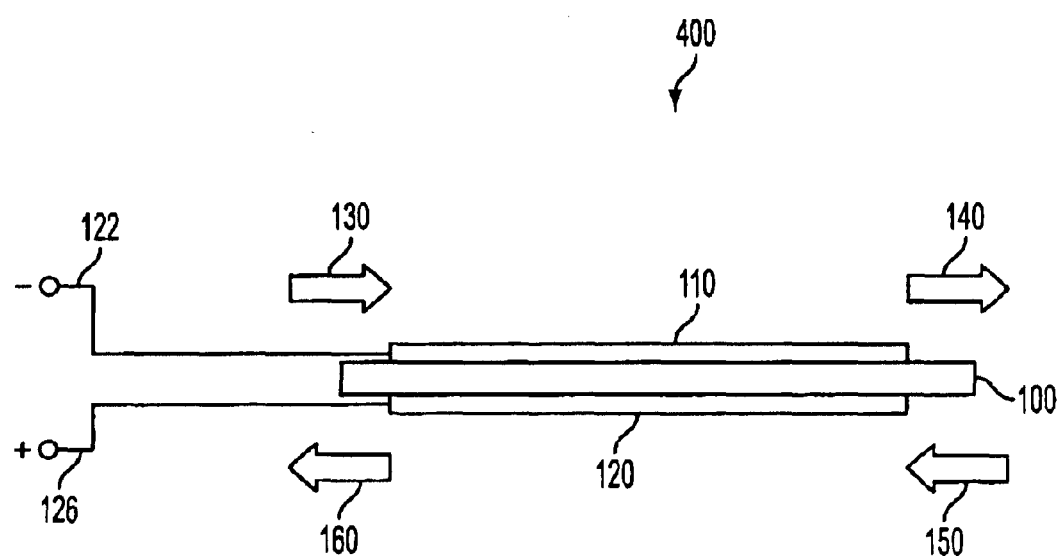
FIG. 5 is a schematic illustration of basic elements of SORFC in discharge mode.

The SORFC is an electrochemical device based on a solid, oxygen ion conducting electrolyte, which is capable of generating electrical energy by oxidation of a fuel, and which is also capable of regenerating the oxidized fuel back into fuel. FIG. 5 shows a functional schematic of a SORFC in "discharge" or "electricity generation" mode.

The SORFC 400 contains a solid electrolyte 100, a fuel electrode 110 and an oxygen electrode 120. The electrolyte 100 is an oxygen ion conducting material such as a ceramic material. Preferably, yttria stabilized zirconia (YSZ) is used, but other materials, such as gadolinia doped ceria or scandia doped zirconia can also be used. The oxygen electrode 120 is made from a material that can conduct electrons in an oxidizing environment. Two preferred materials are strontium doped lanthanum manganite (LSM) and platinum, which is often mixed with an oxygen ion conductor such as YSZ. Other materials capable of conducting electrons in an oxidizing environment can also be used.

In non-regenerative solid oxide fuel cells (SOFC), nickel YSZ mixtures are commonly used as fuel electrodes 110 for electrical energy generation. Nickel requires a reducing environment in order to work properly. In a SORFC, the fuel electrode 110 is exposed to a reducing environment during discharge, but is exposed to an oxidized fuel during charge operation. Therefore, materials capable of conducting electrons in an oxidizing environment should be used at the fuel electrode 110. Similarly to the oxygen electrode 120, platinum that is mixed with YSZ or LSM is preferably used as a fuel electrode 110 material. Other materials that are capable of conducting electrons in an oxidizing environment can also be used.

The fuel supply 130 reaches the fuel electrode side of the SORFC 400. The fuel 130 is preferably hydrogen, but other fuels, for example hydrocarbons or oxygenated hydrocarbons can also be used. An oxidizer 150, preferably air, reaches the SORFC on the oxygen electrode side. Other oxidizer, for example pure oxygen can be used. The fuel reacts with oxygen available at the fuel electrode 110 and thereby creates a low oxygen partial pressure on the fuel electrode 110 side of the cell.

Electrically conductive electrodes 110 and 120 on both sides of the electrolyte 100 can provide and absorb electrons and thereby oxygen ions can be generated and consumed. The difference in partial pressure of oxygen between the fuel electrode 110 and the oxygen electrode 120 drives negatively charged oxygen ions from the oxygen electrode 120 through the electrolyte 100 to the fuel electrode 110. Thereby, negative electrical charge is transported from the oxygen electrode 120 to the fuel electrode 110. This charge transport generates an electrical potential difference between fuel electrode 110 and oxygen electrode 120, which can be used to drive an electrical circuit (not shown in Figures for clarity) connected to the SORFC via the fuel electrode electrical connection 122 and the oxygen electrode electrical connection 126.

Oxidized fuel leaves the SORFC in the oxidized fuel outflow 140. The oxidized fuel preferable consists of a mixture of water vapor and unreacted hydrogen, but other materials are also possible. Oxygen depleted oxidizer leaves the SORFC in the depleted oxidizer outflow 160. The oxygen depleted oxidizer is preferably air with a reduced oxygen content as compared to the oxidizer inflow 150, but other materials can also be used.

Figure 6:
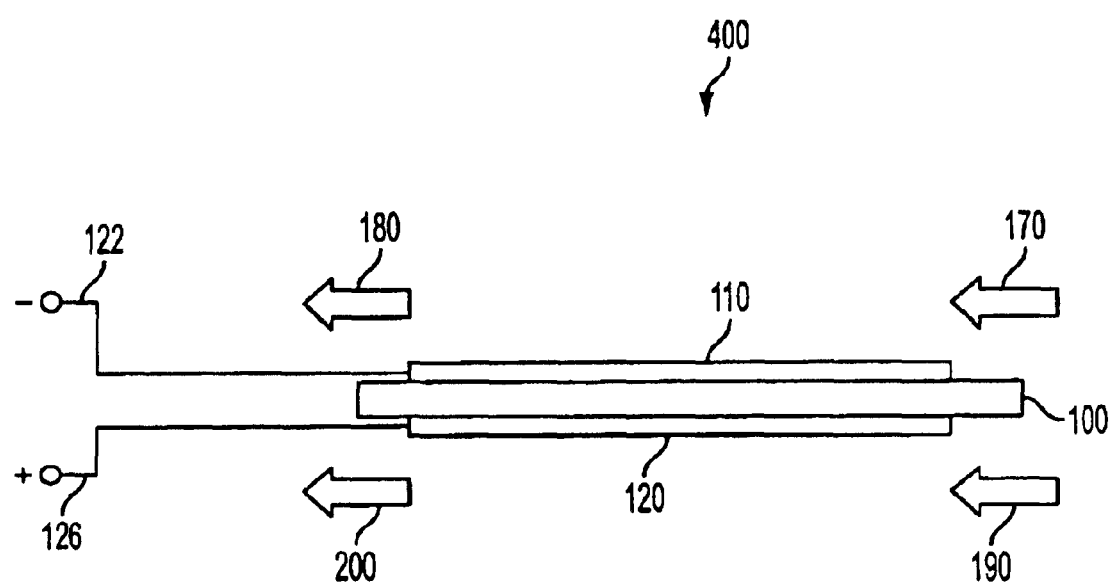
FIG. 6 is a schematic illustration of basic elements of SORFC in charge mode.

FIG. 6 illustrates a functional schematic of the SORFC 400 in "electrolyzer" or "charge" mode. Oxidized fuel reaches the fuel electrode 110 at the oxidized fuel inflow 170. The oxidized fuel is preferably water vapor, but other materials, for example a mixture of carbon oxides and water vapor can also be used. An electrical potential is applied through the fuel electrode electrical connection 122 and oxygen electrode electrical connection 126. This creates a driving force to electrolyze the oxidized fuel 170 at the fuel electrode 110 and transport the oxygen through the electrolyte 100 to the oxygen electrode 120. As in the discharge mode, the transfer of oxygen from the fuel electrode 110 through the electrolyte 100 to the oxygen electrode 120 occurs in the form of oxygen ion transport.

Regenerated fuel and residual oxidized fuel leave the SORFC at the regenerated fuel outflow 180. This mixture preferably consists of hydrogen and water vapor, but other materials are also possible. An optional oxygen electrode inflow 190 can be provided to the oxygen electrode 120. This optional oxygen electrode inflow 190 can; for example, provide temperature management of the SORFC, but can also serve other purposes and it may also be absent. Ambient air is a preferred material for the optional oxygen electrode inflow 190, but other materials can also be used. The regenerated oxidizer outflow 200 removes regenerated oxidizer and optional oxygen electrode inflow 190 from the cell. This regenerated oxidizer outflow preferably consists of pure oxygen or an oxygenair mixture, but other materials can also be used.

Figure 7:
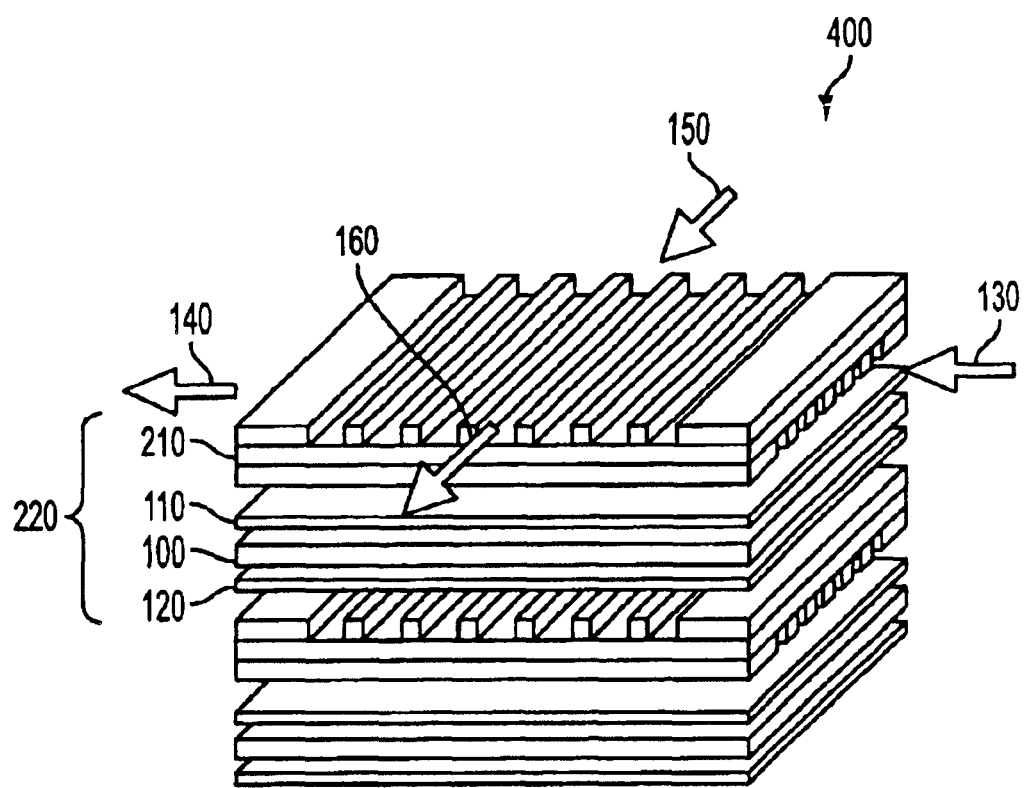
FIG. 7 is a three dimensional view of planar SORFC stack.

For practical use the SORFC can be packaged in a multi-cell system by stacking a number of the repeating elements 220 as shown in FIG. 7. The amount of power available from an SORFC depends on the electroded area. Multi-cell systems provide for convenient packaging of large electroded areas.

FIG. 7 illustrates an example for packaging of multiple SORFC. Here a planar electrolyte 100, with fuel electrode 110 and oxygen electrode 120 applied to either side of the planar electrolyte 100, is sandwiched between interconnect plates 210 thereby forming a stack. The elements shown in FIG. 7 can be repeated many times to form a large SORFC stack. The interconnect plate 210 serves several functions. The interconnect plate 210 separates the gas volume adjacent to the fuel electrode 110 from the gas volume adjacent to the oxygen electrode 120. This separation avoids uncontrolled reaction or mixing of the gases on the two sides of each electrolyte 100. In SORFC, this separation is also important to avoid losses of the fuel or oxidized fuel, which would limit the useful life of the energy storage device. The interconnect 210 also provides a flow path for the gases on either side of the electrolyte. For example, the gas flow paths may comprise grooves in plate 210.

FIG. 7 illustrates a system with the fuel inflow 130 on the right side of the SORFC stack and the oxidized fuel outflow 140 on the left side of the stack. The oxidizer flow proceeds from the oxidizer inflow 150 on the back side of the stack to the depleted oxidizer outflow 160 on the front of the stack. This cross-flow configuration is one preferred flow path. Other preferred flow paths are co-flow where both gases stream in the same direction and counter flow where the two gases flow in opposite directions. The system can also be provided with other flow paths, for example paths based on circular stack geometries. The interconnect plate 210 can also provide an electrical current path within the stack. One preferred example is an interconnect 210 fabricated from an electrically conductive material. One side of interconnect 210 contacts a fuel electrode 110, and the other side contacts an oxygen electrode 120. Current flows through the interconnect 210 to the fuel electrode 110, through the electrolyte 100, through the oxygen electrode 120, and then through the next interconnect 210. This group of conducting elements can be repeated. One preferred material for the interconnect 210 is a metal which expands at the same rate as the electrolyte 100 during temperature changes, such as a metal felt described in U.S. provisional application serial No. 60/357,636, filed Feb. 20, 2002, incorporated herein by reference. Other examples are high temperature alloys, ferritic steels, or electrically conductive ceramics. Other materials can be used for the interconnect 210. For many of these materials surface coatings may be added in order to achieve a chemically stable system.

In a SORFC, both sides of the interconnect 210 need to be capable of operating in an oxidizing environment. In contrast, in a SOFC, the side of the interconnect 210 facing the fuel electrode 110 can be operated solely in a reducing environment which poses relaxed requirements for the interconnect 210.

The planar stacked electrolytes in FIG. 7 are only one preferred example for packaging of SORFC. Other possibilities include, but are no limited to, cells in which the electrolyte is formed into tubes.

Figure 8:
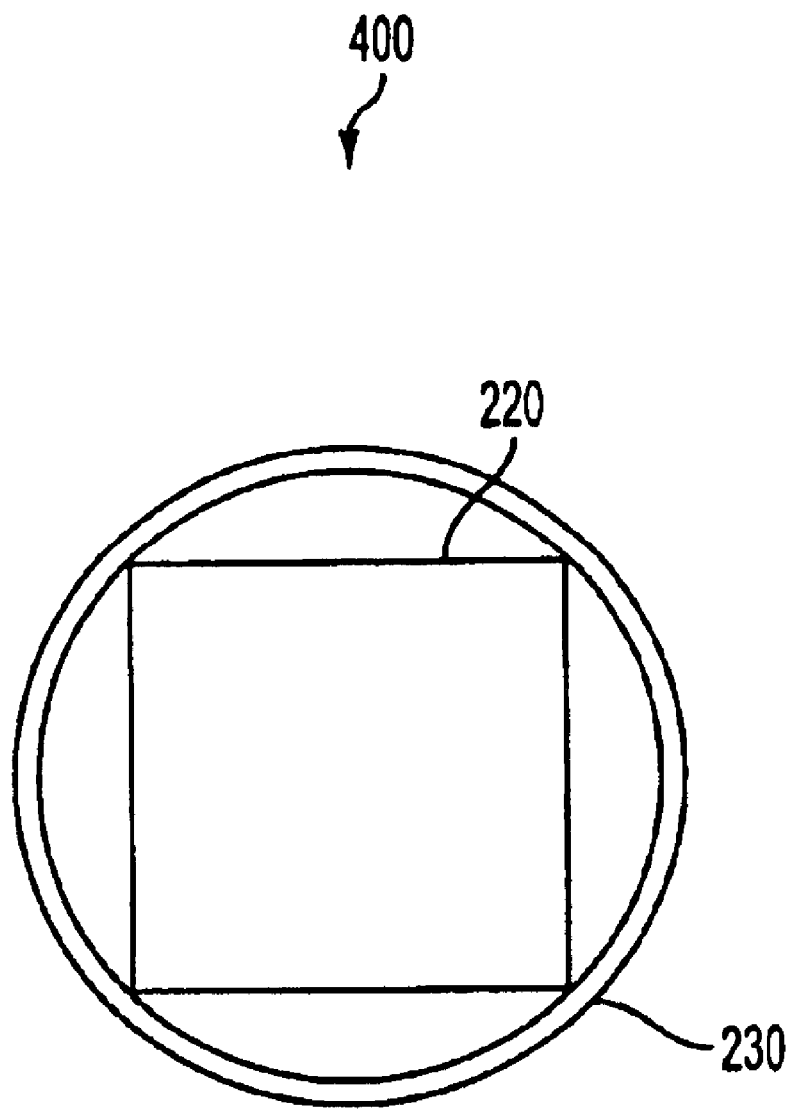
FIG. 8 is a schematic illustration of manifolded SORFC stack.

FIG. 7 does not show how the gases are manifolded in order to supply and remove gas from the repeating stack elements 220. FIG. 8 presents one preferred example for external manifolding of the stack elements shown in FIG. 7. The repeating elements 220 are mounted inside a circular cylinder 230. Gas distribution to the repeating elements 220 is provided in the space between the square stack repeating elements 220 and the inner wall of the circular cylinder 230. Other manifolding schemes are also possible.

The electrolyte 100 is preferably between 50 and 400 micrometer thick, such as 100–200 micrometer thick. Systems with thinner and thicker electrolytes are also possible. The fuel electrode 110 is preferably 20 to 50 micrometer thick, such as 30–40 micrometer thick, while the preferred thickness for the oxygen electrode 120 is between 30 and 80 micrometer, such as 45–65 micrometer thick. Other electrode thicknesses are possible. The interconnect 210 is preferably 1 to 5 mm thick, such as 2–4 mm thick. Preferred operating voltages during discharge are 0.6V to 1.0V per cell. Preferred operating voltages during charging are 1.0 to 2.1V per cell. Different voltages may be used in operation. Preferred power densities during discharge range between 100 and 1000 mW per square centimeter, such as 100–300 mW per square centimeter of electroded area. Preferred current densities during charging range between 100 and 2000 mA per square centimeter, such as 500–1500 mA per square centimeter electroded area. Larger and smaller values for power density and current density are possible. The preferred active area for each cell within a stack ranges between 9 and 500 square centimeter. The preferred dimension for the cell stack elements shown in FIG. 7 is a side length between 3 and 25 cm, such as 7–15 cm. The preferred number of cells within a stack ranges from 5 cells to 200 cells, such as 50–100 cells. Larger and smaller cells as well as more and fewer cells per stack are possible.

FIGS. 9 to 12 illustrate a preferred SORFC system in which the fuel and the oxidized fuel are stored and regenerated. It is possible to also store and regenerate the oxidizer. However, one of the major advantages of SORFC is the ability to operate for an unlimited number of cycles without oxidizer storage.

Figure 9:
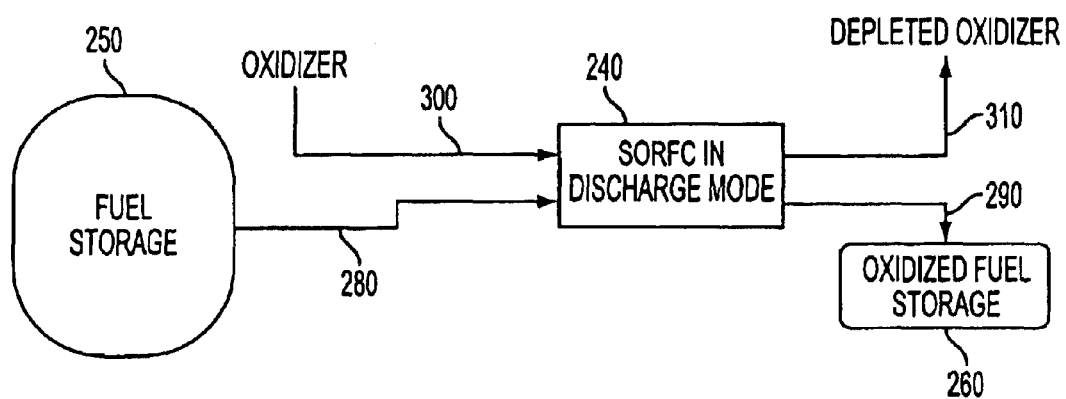
FIG. 9 is a schematic illustration of SORFC system in discharge mode.

The SORFC energy storage system in discharge or electricity generation mode is illustrated in FIG. 9. Fuel is stored in the fuel storage vessel or tank 250. In one preferred embodiment the fuel is hydrogen which is stored as compressed gas. Other preferred storage options for hydrogen fuel include, but are not limited to, cryogenic storage, metal hydrides, carbon adsorption (graphite, nanotube, or activated), sodium borohydride, and glass microspheres. Hydrocarbon fuel maybe used instead. The fuel tank SORFC connecting line 280 delivers fuel to the SORFC system 240. Oxidizer is provided from ambient through oxidizer inlet line 300 to the SORFC system 240. In the SORFC system 240, fuel is oxidized with the oxidizer and electrical energy and heat are generated. The oxidized fuel is delivered to the oxidized fuel storage tank 260 through the oxidized fuel tank SORFC system connecting line 290. In one preferred aspect, the oxidized fuel is water, and the water is stored in its liquid, solid, or partly frozen state. The depleted oxidizer is vented to ambient through the oxidizer outlet line 310.

Figure 10:
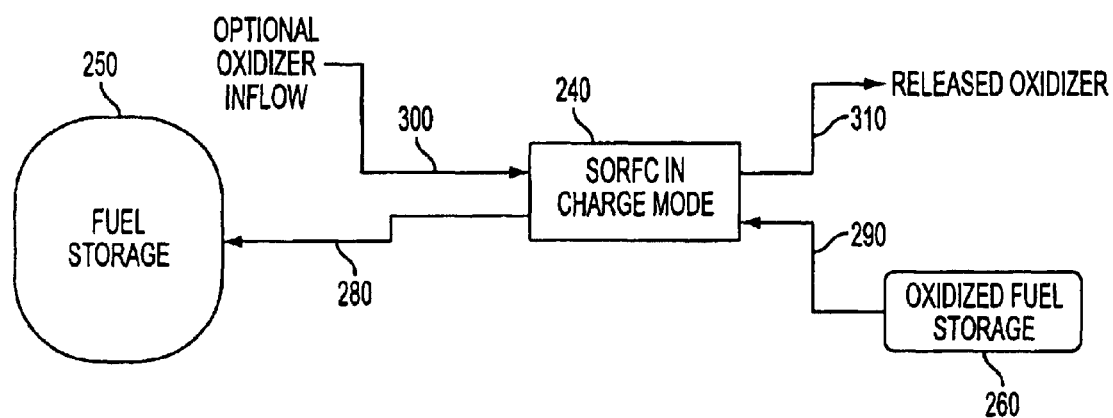
FIG. 10 is a schematic illustration of SORFC system in charge mode.

FIG. 10 illustrates the SORFC energy storage system in charge or electrolyzer mode. Stored oxidized fuel is provided from the oxidized fuel storage tank 260 to the SORFC system 240 via the oxidized fuel tank SORFC system connecting line 290. In the SORFC system 240, oxidized fuel is electrolyzed to fuel and oxidizer. The fuel generated is transported to the fuel storage tank 250 through the fuel tank SORFC system connecting line 280. The oxidizer generated in the SORFC system 240 is vented back to ambient through the oxidizer outlet line 310. Optionally, fresh oxidizer (i.e., air) can be provided to the SORFC system 240 during the charge mode through the oxidizer inlet line 300. This optional inlet stream can for example serve as the thermal control of the SORFC system.

Figure 11:
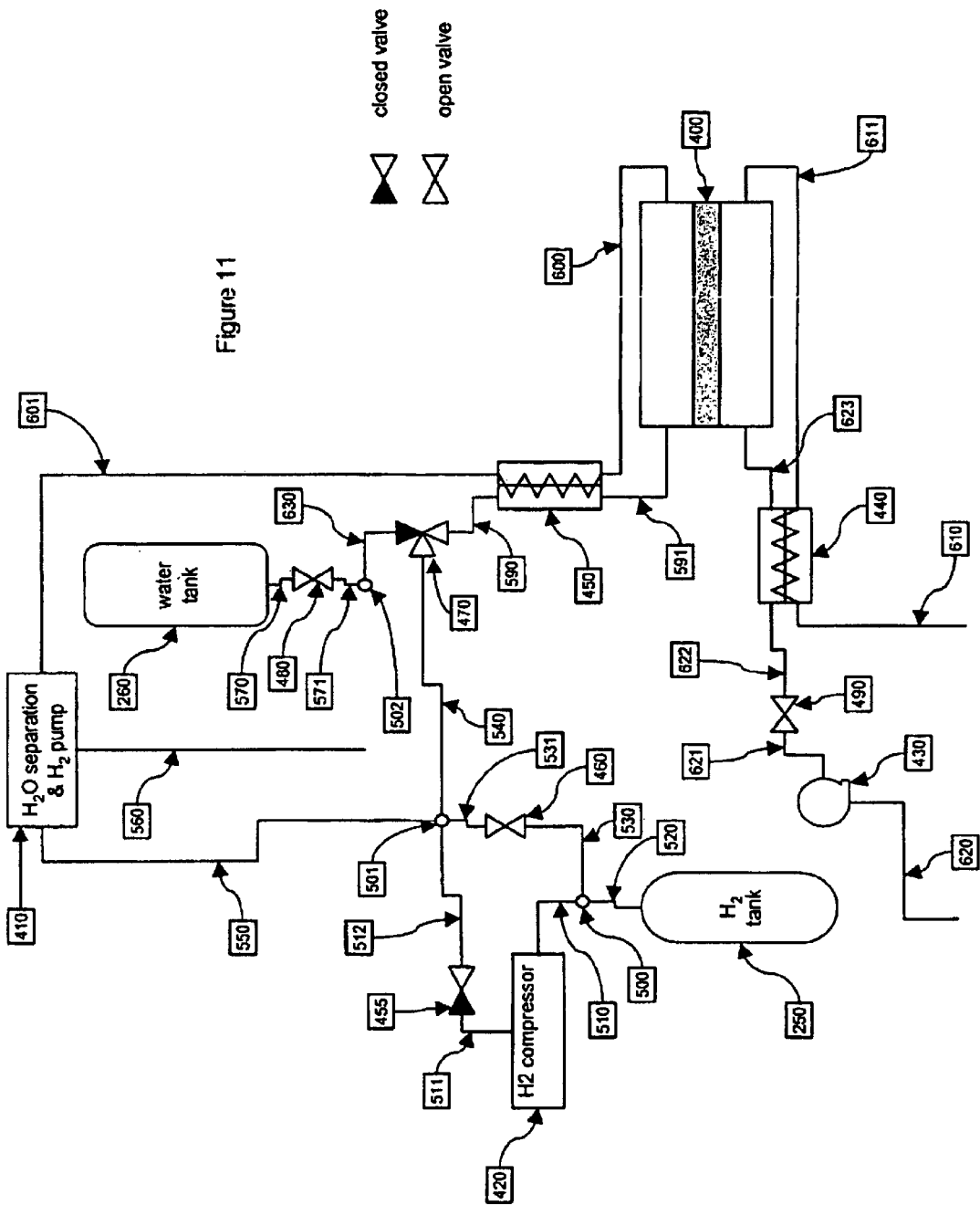
FIG. 11 is a schematic illustration of SORFC system components in discharge mode.

FIG. 11 illustrates one preferred layout of the SORFC energy storage system, which includes fuel and oxidizer flow control. FIG. 11 illustrates this system in discharge mode. Fuel from the fuel storage tank 250 is provided to the SORFC input selector valve 470 through the fuel tank delivery line 520, the fluids junction 500, the fuel compressor bypass line 530, the fuel compressor bypass valve and regulator 460, the fuel compressor bypass line 531 the fluids junctions 501, and the fuel delivery line 540. An additional stream of fuel from the water/hydrogen separator and pump 410 is also delivered to the SORFC input selector valve 470 through the separator fuel outlet line 550, the fluids junction 501, and the fuel delivery line 540.

The fuel is transported from the SORFC input selector valve 470 to the SORFC 400 via the SORFC fuel side input lines 590 and 591. The fuel can be preheated in the optional fuel heat exchanger 450. In the SORFC 400, the fuel is reacted with oxidizer and generates electrical energy and heat. In a preferred layout, the fuel is only partially oxidized, and the partially oxidized fuel (i.e., hydrogen and water) is transported to the separator and pump 410 via the SORFC fuel side outlet lines 600 and 601. Preferably, the optional fuel heat exchanger 450 extracts heat from the partially oxidized fuel. The heat extracted from the partially oxidized fuel is used to heat the fuel inflow to the SORFC 400.

In the separator and pump 410 oxidized fuel (i.e., water) and fuel (i.e., hydrogen) are separated. This separator and pump 410 can preferably be a centrifugal device that both separates and adds energy to (i.e. pressurizes) the liquid and the gaseous components. The fuel is pressurized and returned to the SORFC input selector valve 470 through the separator fuel outlet line 550, the fluids junction 501, and the fuel delivery line 540, as described previously. The oxidized fuel (i.e., water) is transported from the separator and pump 410 to the oxidized fuel tank 260, via the separator oxidized fuel outlet line 560, the fluids junction 502, the oxidized fuel tank line 571, the oxidized fuel storage valve and regulator 480, and the oxidized fuel tank line 570. The separator and pump 410 delivers the oxidized fuel at a pressure suitable for storage in tank 260. In one preferred embodiment the fuel storage tank 250 and the oxidized fuel storage tank 260 are combined in one vessel. For the preferred option of hydrogen fuel and water as the oxidized fuel, fuel and oxidized fuel can be easily separated due to their different phases (gas vs. liquid). The gaseous fuel can provide pressurization for the liquid oxidized fuel and thereby facilitate delivery of the oxidized fuel during charge mode.

Oxidizer, such as air, needed for the oxidation of the fuel is provided to the SORFC 400 through the SORFC oxidizer side inlet lines 620, 621, 622, and 623, and the oxidizer input valve 490. The oxidizer is driven into the SORFC 400 by the oxidizer blower 430. The oxidizer can be preheated in the optional oxidizer heat exchanger 440. The depleted oxidizer is vented through the SORFC oxidizer side outlet lines 610 and 611. Lines 610 and 611 preferably pass through the optional oxidizer heat exchanger 440 to extract heat from the depleted oxidizer outlet stream and thereby preheat the oxidizer inflow. Alternatively, the incoming fuel may be preheated by the depleted oxidizer stream and/or the incoming oxidizer may be preheated by the oxidized fuel stream, if the location of lines 600/601 and/or 610/611 is reversed with respect to heat exchangers 440, 450.

The valve and regulator 460 is open in the discharge mode, while the fuel compressor valve 455 is closed. Valve 470 is a three way valve, which is switched to allow fuel flow between lines 540 and 590, while preventing oxidized fuel flow from line 630 to line 590.

Figure 12:
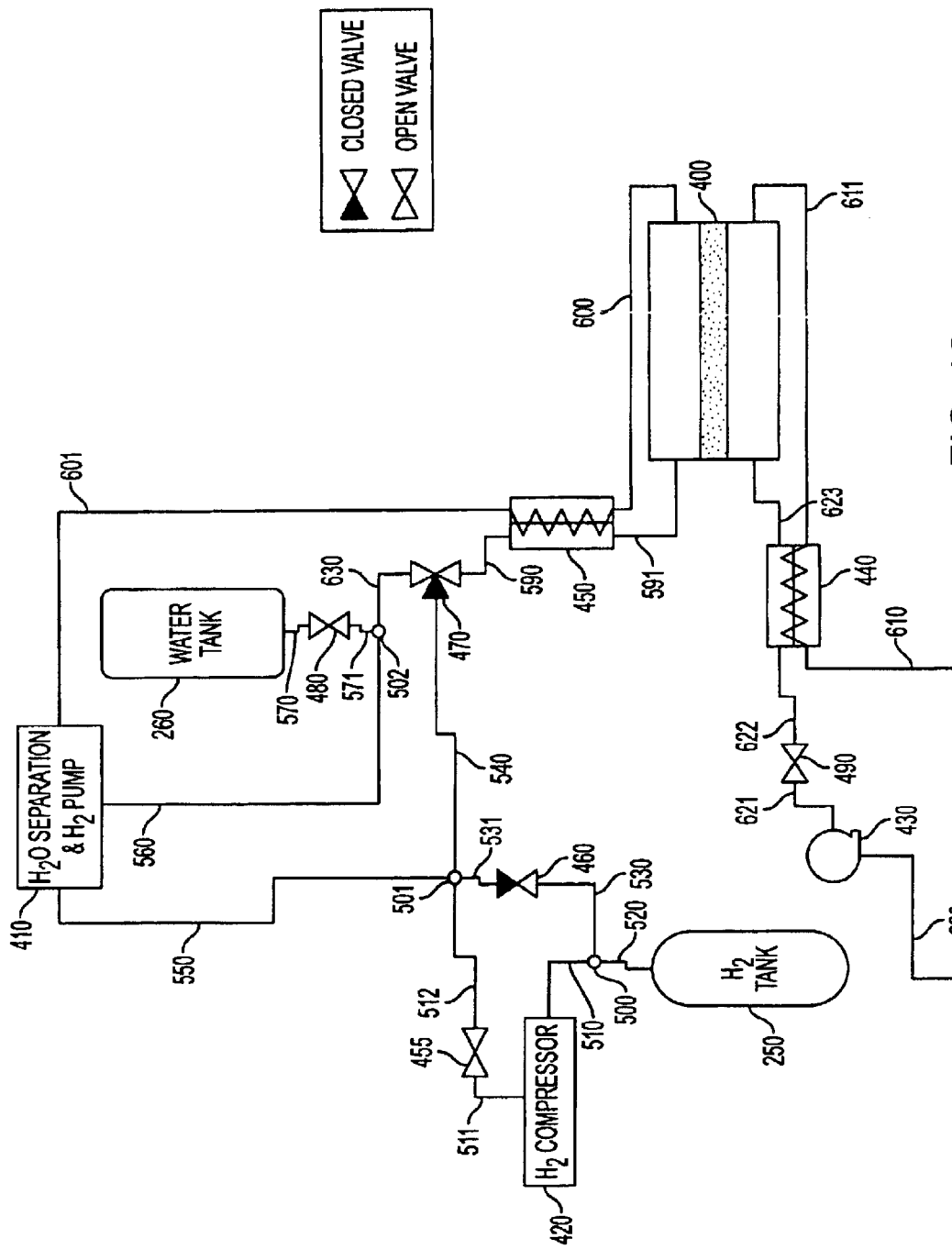
FIG. 12 is a schematic illustration of SORFC system components in charge mode.

FIG. 12 illustrates how the system shown in FIG. 11 operates in the charge mode. Oxidized fuel (i.e., water) is delivered to the SORFC input selector valve 470 from the oxidized fuel storage tank 260 via the oxidized fuel tank line 570, the open oxidized fuel storage valve and regulator 480, the oxidized fuel tank line 571, the fluids junction 502, and the oxidized fuel delivery line 630. Additional oxidized fuel is provided from the separator and pump 410 to the SORFC input selector valve 470 via the separator oxidized fuel outlet line 560, the fluids junction 502, and the oxidized fuel delivery line 630. The oxidized fuel is transported from the SORFC input selector valve 470 to the SORFC 400 through the SORFC fuel side input lines 590 and 591. The oxidized fuel can be preheated in the optional fuel heat exchanger 450.

In the SORFC 400, the oxidized fuel is electrolyzed. Partly regenerated fuel (i.e., hydrogen and water) is transported from the SORFC 400 to the separator and pump 410 through the SORFC fuel side outlet lines 600 and 601. The optional fuel heat exchanger 450 can extract heat from the partially regenerated fuel and provide pre-heat to the oxidized fuel inflow. In the separator and pump 410, the regenerated fuel (i.e., hydrogen) and oxidized fuel (i.e., water) are separated. Fuel is transported from the separator and pump 410 to the fuel tank 250 through the separator fuel outlet line 550, the fluids junction 501, the fuel compressor line 512, the optional fuel compressor valve 455, the fuel compressor line 511, the optional fuel compressor 420, the fuel compressor line 510, the fluids junction 500, and the fuel tank delivery line 520. The optional compressor 420 pressurizes the fuel for storage in the fuel storage tank 250. The optional compressor 420 is preferably an electrochemical hydrogen pump. Oxidized fuel from the separator and pump 410 is re-circulated to the SORFC input selector valve 470 via the separator oxidized fuel outlet line 560, the fluids junction 502, and the oxidized fuel delivery line 630. The separator and pump 410 brings the output oxidized fuel to a pressure suitable for recirculation.

Regenerated oxidizer is vented from the SORFC 400 to ambient via the SORFC oxidizer side outlet lines 610 and 611. The optional oxidizer heat exchanger 440 can extract heat from the regenerated oxidizer outflow. Optionally, additional oxidizer can be provided from ambient to the SORFC 400 through the SORFC oxidizer inlet line 620, the oxidizer blower 430, the SORFC oxidizer inlet line 621, the oxidizer input valve 490, the SORFC oxidizer inlet line 622, and the SORFC oxidizer inlet line 623. The optional oxidizer heat exchanger 440 can add heat to the oxidizer inflow. In one preferred embodiment the optional oxidizer inflow provides thermal control for the SORFC 400.

The valve and regulator 460 is closed in the charge mode, while valve 455 is open. Valve 470 is a three way valve, which is switched to prevent fuel flow between lines 540 and 590, while allowing oxidized fuel flow from line 630 to line 590.

The SORFC system 240 described previously contains the SORFC 400 and controlling elements, associated electrical circuits, peripheral fluid lines, valves and heat exchangers. The fuel tank SORFC system connecting line 280 includes lines 510, 511, 512, 520 and 540. The oxidized fuel tank SORFC system connecting line includes lines 560, 570, 571, 590, 591, 600, 601, and 630. The oxidizer inlet line 300 includes lines 620, 621, 622, and 623. The oxidizer outlet line 310 includes lines 610 and 611.

The SORFC energy storage system can be sized for a wide range of power and energy storage requirement. Preferred power levels range from 1 kW to 10 MW, but smaller and larger systems are possible. There are virtually no limits for the amount of energy that can be stored. Appropriate tank sizing can store energy from a few Whr (Watt hours) to GWhr (Gigawatt hours). The SORFC energy storage system is especially advantageous at large energy levels, where large energy storage densities can be realized. Energy storage densities in excess of 450 Whr/kg can be realized. Energy storage efficiencies (energy available in discharge divided by energy needed to charge) on the order of 0.5 can be realized.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings are not necessarily to scale and illustrate the device in schematic block format. The drawings and description of the preferred embodiments were chosen in order to explain the principles of the invention and its practical application, and are not meant to be limiting on the scope of the claims. It is intended that the scope of the invention be defined by the claims appended hereto, and their equivalents.

Parts List:
100 electrolyte
110 fuel electrode
120 oxygen electrode
122 fuel side electrical connection 126 oxygen side electrical connection
130 fuel inflow
140 oxidized fuel outflow
150 oxidizer inflow
160 depleted oxidizer outflow
170 oxidized fuel inflow
180 regenerated fuel outflow
190 optional oxygen side inflow
200 regenerated oxidizer outflow
210 interconnect
220 repeating elements
230 gas manifold
240 SORFC system
250 fuel storage tank
260 oxidized fuel storage tank
280 fuel tank SORFC system connecting line
290 oxidized fuel tank SORFC system connecting line
300 oxidizer inlet line
310 oxidizer outlet line
400 Solid Oxide Regenerative Fuel Cell (SORFC)
410 fuel/oxidized fuel separator and pump
420 fuel compressor
430 oxidizer blower
440 oxidizer heat exchanger
450 fuel heat exchanger
455 fuel compressor valve
460 fuel compressor bypass valve and regulator
470 SORFC input selector valve
480 oxidized fuel storage valve and regulator
490 oxidizer input valve
500 fluids junction
501 fluids junction
502 fluids junction
510 fuel compressor line
511 fuel compressor line
512 fuel compressor line
520 fuel tank delivery line
530 fuel compressor bypass line
531 fuel compressor bypass line
540 fuel delivery line
550 separator fuel outlet line
560 separator oxidized fuel outlet line
570 oxidized fuel tank line
571 oxidized fuel tank line
590 SORFC fuel side input line
591 SORFC fuel side input line
600 SORFC fuel side outlet line
601 SORFC fuel side outlet line
610 SORFC oxidizer side outlet line
611 SORFC oxidizer side outlet line
620 SORFC oxidizer inlet line
621 SORFC oxidizer inlet line
622 SORFC oxidizer inlet line
623 SORFC oxidizer inlet line
700 solar array
710 electrical cable
720 electrical cable
730 electrical cable
740 motor propeller
750 SOFC
760 electrical cable
800 heat transfer loop
810 payload or equipment

We claim:

1. A solid oxide fuel cell adapted to power an airborne vehicle, wherein the solid oxide fuel cell comprises a solid oxide regenerative fuel cell (SORFC).

2. The fuel cell of claim 1, wherein:
the SORFC is adapted to power an unmanned, solar powered airplane in absence of sunlight; and
the SORFC is adapted to regenerate fuel using electricity generated from sunlight.

3. The fuel cell of claim 1, wherein the SORFC is located in and is adapted to power an unmanned, electrically powered airplane.

4. The fuel cell of claim 1, wherein the fuel cell is also adapted to provide heat to payload or equipment of the airborne vehicle.

5. An electrically powered airplane, comprising:
an airplane body;
a solid oxide regenerative fuel cell (SORFC) adapted to power the airplane; and
a fuel storage vessel adapted to provide fuel to the solid oxide regenerative fuel cell;
wherein the airplane does not lose water with oxidizer discharge from the fuel cell.

6. The airplane of claim 5, wherein the airplane comprises an unmanned, propeller driven high altitude airplane.

7. The airplane of claim 6, wherein:
the airplane comprises a solar powered airplane containing a solar cell array;
the SORFC is adapted to power the airplane in absence of sunlight; and
the SORFC is adapted to regenerate fuel using electricity generated from sunlight by the solar cell array.

8. The airplane of claim 6, further comprising an oxidized fuel storage vessel adapted to store oxidized fuel output by the fuel cell.

9. The airplane of claim 8, wherein:
the fuel storage vessel is adapted to store hydrogen; and
the oxidized fuel storage vessel is adapted to store water.

10. The airplane of claim 5, wherein the fuel storage vessel is adapted to store both hydrogen fuel and water oxidized fuel.

11. The airplane of claim 9, further comprising:
an air inlet adapted to provide air to the fuel cell; and
an air outlet adapted to vent air from the fuel cell.

12. The airplane of claim 5, further comprising a heat transfer loop adapted to transfer heat from the fuel cell to payload or equipment located remotely in the airplane body.

13. The airplane of claim 5, further comprising a motor propeller system is powered by the fuel cell.

14. The airplane of claim 5, further comprising an oxidized fuel separation and fuel pump system adapted to separate partially oxidized fuel output by the fuel cell into fuel and oxidized fuel, to pump fuel into the fuel cell or the fuel storage vessel, and to pump oxidized fuel into an oxidized fuel storage vessel or into the fuel cell.

15. An electrically powered airplane, comprising:
an airplane body;
a solid oxide regenerative fuel cell (SORFC) adapted to power the airplane and to heat remotely located payload or equipment in the airplane body; and
a fuel storage vessel adapted to provide fuel to the solid oxide regenerative fuel cell;
wherein the airplane does not lose water with oxidizer discharge from the fuel cell.

16. The airplane of claim 15, wherein:
the airplane comprises an unmanned, propeller driven high altitude airplane.

17. The airplane of claim 16, wherein:
the airplane comprises a solar powered airplane containing a solar cell array;
the SORFC is adapted to power the airplane in absence of sunlight; and
the SORFC is adapted to regenerate fuel using electricity generated from sunlight by the solar cell array.

18. The airplane of claim 16, further comprising an oxidized fuel storage vessel adapted to store oxidized fuel output by the fuel cell.

19. The airplane of claim 18, wherein:
the fuel storage vessel is adapted to store hydrogen; and
the oxidized fuel storage vessel is adapted to store water.

20. The airplane of claim 18, further comprising:
an air inlet adapted to provide air to the fuel cell; and
an air outlet adapted to vent air from the fuel cell.

21. The airplane of claim 15, further comprising a heat transfer loop adapted to transfer heat from the fuel cell to payload or equipment located remotely in the airplane body.

22. A solid oxide fuel cell system, comprising:
a first means for providing oxygen ion conduction to generate a potential difference between a fuel electrode and an oxygen electrode; and
a second means for providing electric power to an airborne vehicle from the potential difference;
wherein the first means is a means for generating electrical energy from a fuel and an oxidizer in a discharge mode and regenerating the fuel from oxidized fuel in a charge mode; and
wherein the airborne vehicle does not lose water with oxidizer discharge from the first means.

23. The fuel cell of claim 22, further comprising a third means for providing the fuel to the first means and a fourth means for providing the oxidizer to the first means.

24. The fuel cell of claim 23, wherein the fuel comprises hydrogen, the oxidizer comprises oxygen or air and the oxidized fuel comprises water.

25. A method of generating power in an airborne vehicle, comprising:
providing a fuel and a oxidizer to a solid oxide regenerative fuel cell; and
providing electrical power from the fuel cell to a motor propeller system of the airborne vehicle;
wherein the airborne vehicle does not lose water with oxidizer discharge from the fuel cell.

26. The method of claim 25, further comprising:
converting sunlight into electrical energy;
providing the electrical energy to the solid oxide regenerative fuel cell;
providing oxidized fuel into the solid oxide regenerative fuel cell;
electrolyzing the oxidized fuel in the solid oxide regenerative fuel cell into partially regenerated fuel;
separating fuel from oxidized fuel in the partially regenerated fuel; and
storing the fuel and the oxidized fuel.

27. The method of claim 25, further comprising providing heat to remotely located payload or equipment from the fuel cell.

28. An SORFC power generation system, comprising:
at least one SORFC;
a fuel storage vessel;
an oxidizer inlet;
an oxidized fuel storage vessel; and
a first means for:
(a) separating partially regenerated fuel provided from the at least one SORFC into regenerated fuel and oxidized fuel, for directing the regenerated fuel into the fuel storage vessel and for directing oxidized fuel back into the at least one SORFC; and
(b) separating partially oxidized fuel provided from the at least one SORFC into fuel and oxidized fuel, for directing the fuel back into the at least one SORFC, and for directing oxidized fuel into the oxidized fuel storage vessel.

29. The system of claim 28, further comprising a compressor adapted to compress and provide the regenerated fuel into the fuel storage vessel.

30. The system of claim 28, further comprising at least one heat exchanger adapted to preheat fuel incoming into the at least one SORFC using output of the at least one SORFC.

31. The system of claim 28, wherein the system is located in an airborne vehicle.

32. A method of operating a solid oxide regenerative fuel cell (SORFC), comprising:
a) while the SORFC operates in a charge mode, separating partially regenerated fuel provided from the SORFC into regenerated fuel and oxidized fuel, directing the regenerated fuel into a fuel storage vessel, and directing oxidized fuel back into the SORFC; and
b) while the SORFC operates in a discharge mode, separating partially oxidized fuel provided from the SORFC cell into fuel and oxidized fuel, directing the fuel back into the SORFC, and directing the oxidized fuel into the oxidized fuel storage vessel.

33. The method of claim 32, wherein the fuel comprises hydrogen and the oxidized fuel comprises water.

34. The method of claim 32, wherein the SORFC operating in the discharge mode powers an airborne vehicle.

35. The method of claim 34, further comprising:
converting sunlight into electrical energy;
providing the electrical energy to the SORFC;
providing oxidized fuel into the SORFC; and
electrolyzing the oxidized fuel in the SORFC into the partially regenerated fuel.

36. A method of operating an unmanned, propeller driven high altitude airplane, comprising:
powering a motor propeller system of the airplane with a solid oxide fuel cell (SOFC), wherein the airplane does not lose water with oxidizer discharge from the fuel cell; and
flying the airplane unmanned at an altitude of between 45,000 and 90,000 feet for a plurality of months without landing.

37. The method of claim 36, wherein the solid oxide fuel cell comprises a solid oxide regenerative fuel cell (SORFC).

38. The method claim 37, wherein:
the airplane comprises a solar powered airplane containing a solar cell array;
the SORFC powers the airplane in absence of sunlight; and
the SORFC regenerates fuel using electricity generated from sunlight by the solar cell array.

39. The method of claim 38, further comprising storing oxidized fuel output by the fuel cell in an oxidized fuel storage vessel.

40. The method of claim 39, wherein:

the fuel cell fuel comprises hydrogen; and the oxidized fuel comprises water.

41. The method of claim 37, further comprising:

providing air oxidizer from outside the airplane to the fuel cell; and venting air from the fuel cell outside the airplane without venting water.

42. The method of claim 37, wherein the airplane further comprises an oxidized fuel separation and fuel pump system adapted to separate partially oxidized fuel output by the fuel cell into fuel and oxidized fuel, to pump fuel into the fuel cell or the fuel storage vessel, and to pump oxidized fuel into an oxidized fuel storage vessel or into the fuel cell.

43. The method of claim 36, wherein the airplane lacks an independent source water to make up for water that is lost from the fuel cell.

44. The method of claim 36, wherein the airplane flies at a speed of 10 to 50 mph.

45. The airplane of claim 5, wherein the airplane lacks an independent source water to make up for water that is lost from the fuel cell.

* * * * *